United States Patent [19]
Linning, Jr. et al.

[11] Patent Number: 6,120,934
[45] Date of Patent: Sep. 19, 2000

[54] CELL TRAY ASSEMBLY AND COVER SYSTEM FOR LEAD-ACIDS CELLS AND BATTERIES

[75] Inventors: Robert E. Linning, Jr., Lake in the Hills; Bradley W. Stone, Morris, both of Ill.

[73] Assignee: GNB Technologies, Inc., Atlanta, Ga.

[21] Appl. No.: 09/232,321

[22] Filed: Jan. 18, 1999

Related U.S. Application Data

[60] Provisional application No. 60/074,668, Feb. 13, 1998.

[51] Int. Cl.[7] .............................. H01M 2/04; H01M 2/10
[52] U.S. Cl. ......................... 429/175; 429/99; 429/100; 429/151
[58] Field of Search ..................................... 429/175, 163, 429/151, 155, 159, 9, 97, 99, 100, 176

[56] References Cited

U.S. PATENT DOCUMENTS

| | | |
|---|---|---|
| 2,956,101 | 6/1960 | Buhl . |
| 3,457,119 | 7/1969 | Tench . |
| 4,699,855 | 10/1987 | Abraham et al. ........................ 429/175 |
| 4,952,468 | 8/1990 | Abraham et al. ........................ 429/175 |
| 5,665,486 | 9/1997 | Stocchiero ............................... 429/100 |
| 5,985,483 | 11/1999 | Verhoog et al. ........................ 429/120 |

*Primary Examiner*—Maria Nuzzolillo
*Assistant Examiner*—Tracy Dove
*Attorney, Agent, or Firm*—Leydig, Voit & Mayer, Ltd.

[57] ABSTRACT

An electrically nonconductive cover system is provided which may be readily installed onto and removed from a cell tray assembly while minimizing the likelihood of accidental human contact with lead-acid cells or batteries. The cover system is reliable and secure and permits observation and maintenance of the cells without requiring cover removal.

22 Claims, 7 Drawing Sheets

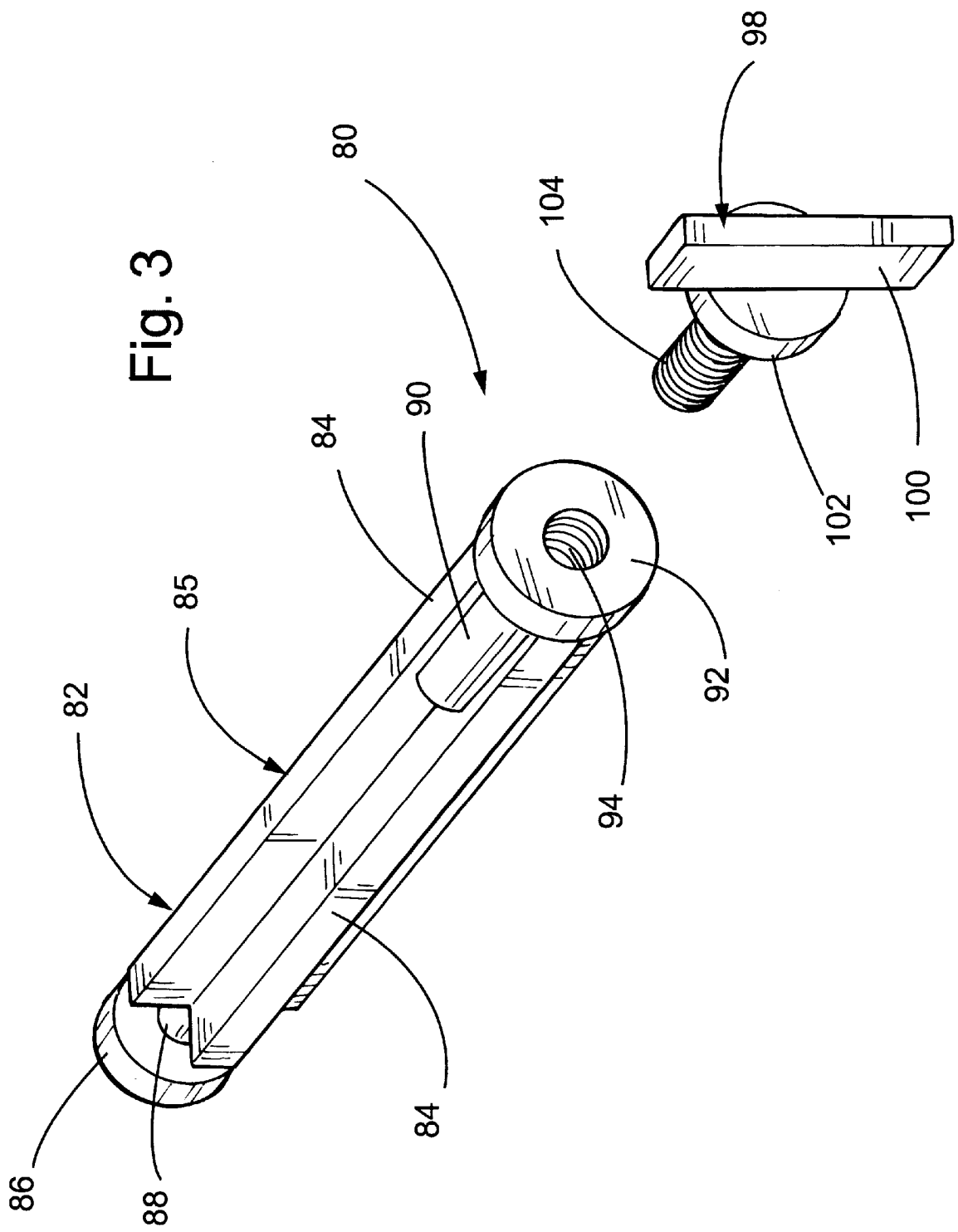

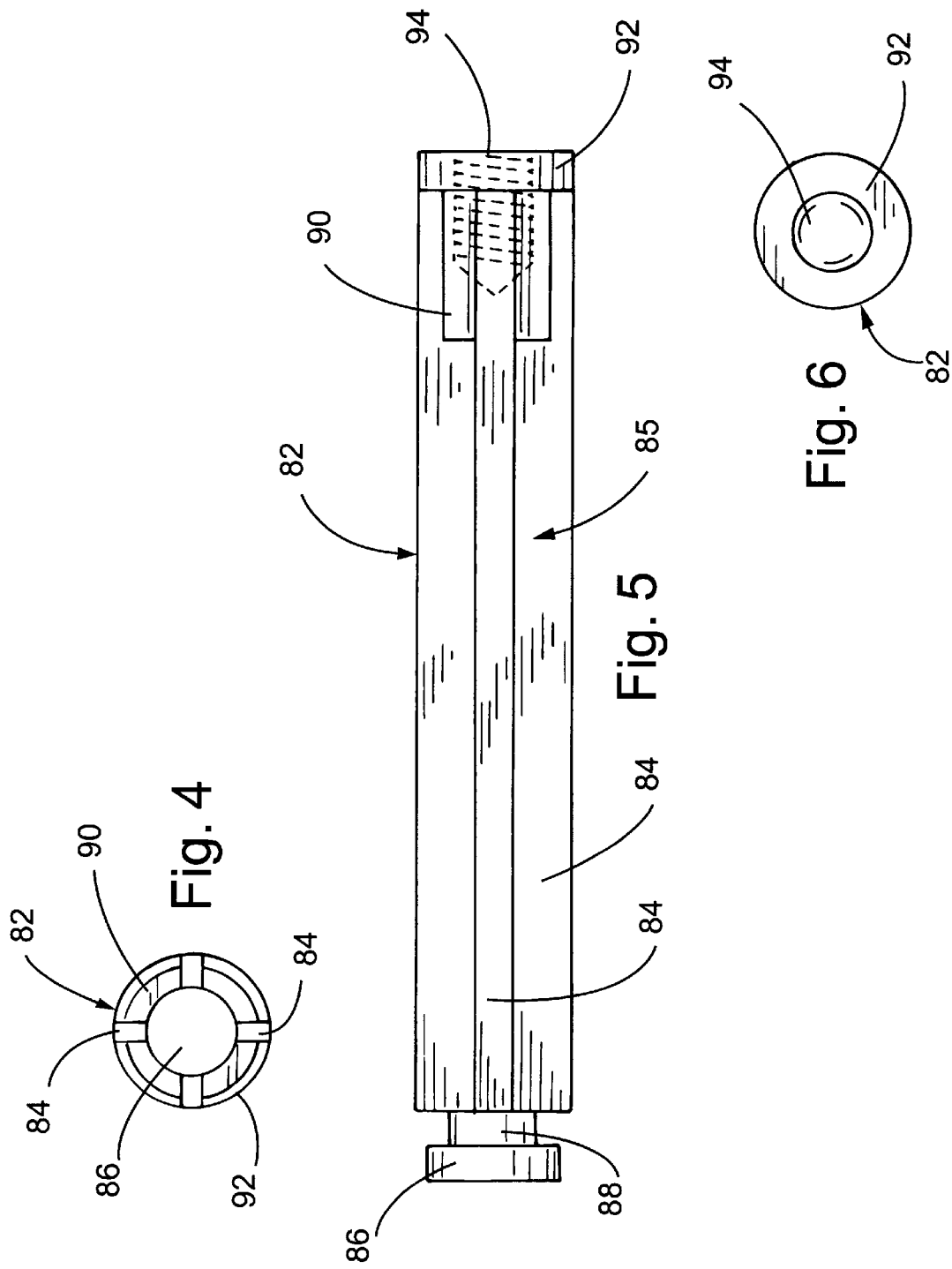

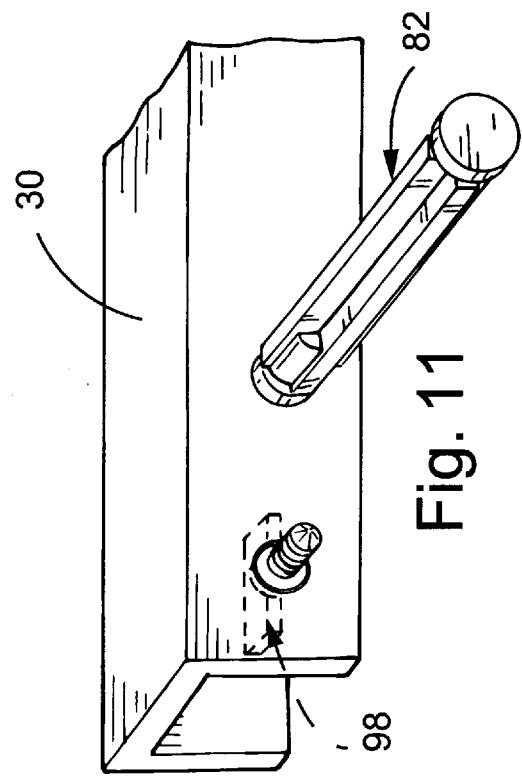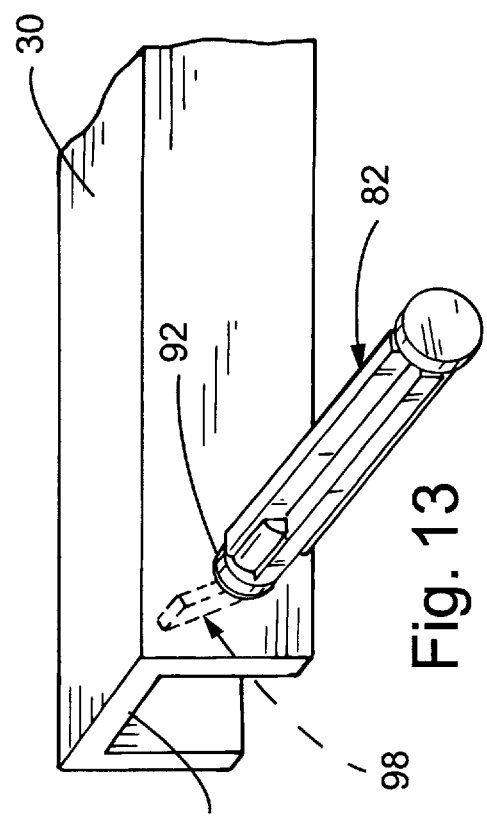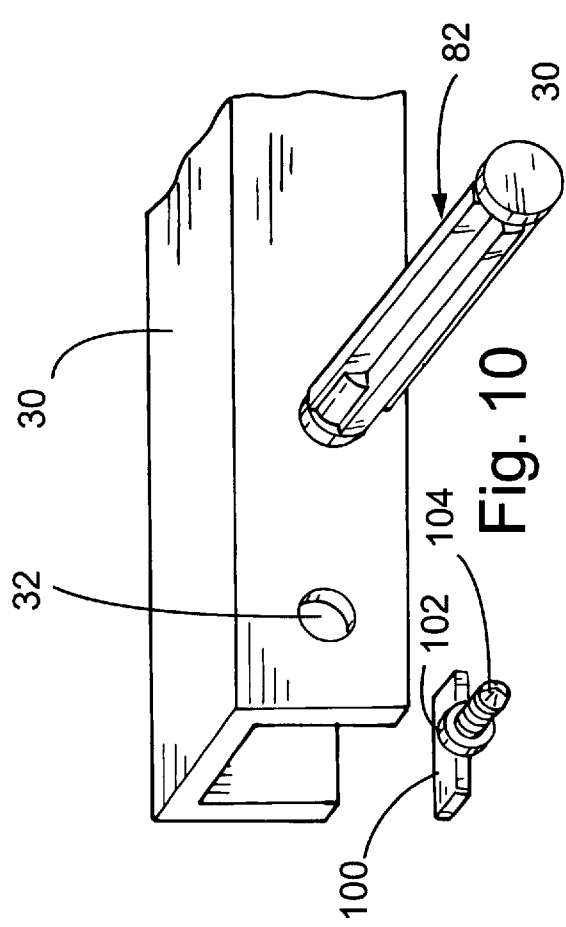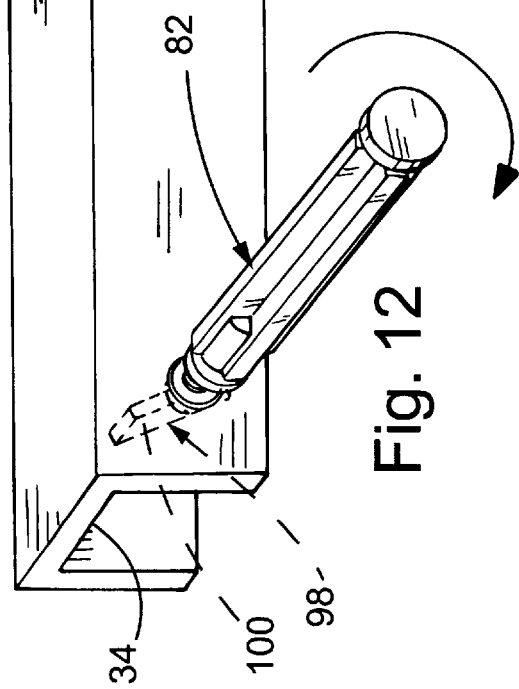
Fig. 10
Fig. 11
Fig. 12
Fig. 13

CELL TRAY ASSEMBLY AND COVER SYSTEM FOR LEAD-ACIDS CELLS AND BATTERIES

This application claims benefit of provisional No. 60/074,668 Feb. 13, 1998.

FIELD OF THE INVENTION

This invention relates to lead-acid cells and batteries, and, more particularly, to a cell tray assembly and cover system for housing such cells and batteries.

BACKGROUND OF THE INVENTION

Stationary batteries are specifically designed for float applications, that is, as standby power in the event of a power failure. Stationary batteries are usually maintained at a full-state-of-charge and in a ready-to-use condition typically by floating at a constant preset voltage. Standby batteries are used for standby or operational power in the communications field, utilities, for emergency lighting in commercial buildings and uninterruptible power supplies.

Uninterruptible power supplies are systems that back-up computers and communication networks. Sealed lead-acid cells and/or batteries may comprise the power source. The uninterruptible power source allows for the orderly shutdown of computers when there is a sudden interruption in the primary electrical source, such as during a power outage, and provides back-up power for communications networks. The uninterruptible power supply also will accommodate short, or intermittent, losses in power. When there is a power interruption, the batteries in the uninterruptible power system can be subject to rapid discharge.

The sealed lead-acid stationary cells and/or batteries used for industrial applications where the power requirements are high and quite demanding are typically comprised of from several to a large number of individual sealed lead-acid cells connected to one another to form a battery with the desired capacity and power requirements. The individual sealed lead-acid cells may be connected in series, in parallel or in suitable combinations of series and parallel to form a battery with the desired capacity and power requirements. External connections are typically made between the negative and positive terminal posts of the respective cells.

Because of space considerations, these large capacity cells need to be placed on racks, cabinets or the like in an attempt to minimize the space requirements. Still further, the face of the cells including the cell terminals and terminal connections must be properly covered to prevent accidental human contact and electrical shorting. For Zone 4 applications, i.e. locations where high seismic conditions can occur, there are even further stringent requirements that must be met to insure that the cells are properly covered and adequately secured in the racks should such high seismic conditions occur. A complicating factor is that although the cells must be properly covered, they also demand routine monitoring and maintenance. Accordingly, the cell covers must be periodically removed to permit access to the cells.

To satisfy these diverse requirements, the cell tray cover systems currently being used, insofar as it can be ascertained, may include metal hardware or plastic spring action supports to secure the cell covers to the rack and tray assembly. Unfortunately, both the metal hardware and plastic spring action supports present major drawbacks. For example, the metal hardware (i.e. "nuts and bolts") requires a number of tools for installation and removal, and since the hardware is electrically conductive, the risk of electrical shock is necessarily exacerbated. Additionally, the metal hardware requires insulation with electrically nonconductive material after installation has been performed. The installation and removal of the hardware is also cumbersome since tools, which may also be electrically conductive, are required.

The plastic spring action supports, which serve to clip the cover onto the cell tray assembly, may offer some improvements over the metal hardware, although still not entirely effective. The plastic supports typically used do not provide the necessary strength and rigidity to support larger sized covers. Consequently, the plastic supports may allow the cell cover to sag and in some cases to even fall off of the cell tray assembly. Insofar as applicants are aware, the plastic spring supports in use lack universality. It is therefore the case that different sized plastic spring supports are used with different sized covers. Still further, a cover utilizing the plastic spring supports may also be cumbersome to install or remove.

It is accordingly a principal object of the present invention to provide a cell tray assembly and cover system for standby applications which effectively and efficiently minimizes the likelihood of accidental contact with cells and batteries during installation and removal of the cover supports.

Another object of the present invention provides a cover system that may be readily attached to, and removed from, a cell tray assembly so as to provide enhanced flexibility in use.

Yet another object of the present invention provides a cover system that may be used with a wide variety of cell and battery applications.

A further object is to provide a cell tray assembly and cover system which is cost-effective and which can be readily manufactured.

Another object of the present invention lies in the provision of such a system which satisfies the requirements for use in high seismic areas, specifically UBC Zone 4 applications.

These and other objects and advantages of the present invention will be apparent from the following descriptions and drawings. While the present invention may be used with any batteries or cells that satisfy the requirements of the particular application, it will be described herein in conjunction with sealed lead-acid cells (often termed "VRLA" cells, i.e., valve-regulated lead-acid).

SUMMARY OF THE INVENTION

In accordance with the present invention, there is provided a cell tray assembly and cover system which is configured to house the number and size of cells required for a particular application. It has been found that the various requirements, including those for seismic conditions, can be satisfied by using a cover and cover supports which achieve upon assembly with desired cell trays, sufficient reinforcement to withstand operational stresses without fatigue. It has also been found that suitable cell tray cover systems may be made of nonconductive materials to prevent harmful accidental contact with cells and batteries.

In this fashion, a cost-effective cell tray cover system is provided which may be readily attached to, and removed from, the cell tray assembly or assemblies needed to satisfy the use requirements for a particular application.

BRIEF DESCRIPTION OF THE DRAWINGS

FIG. 3 is a perspective view of the standoff assembly with the leg and key of the assembly being exploded to show their respective configuration;

FIGS. 4–6, respectively are a front, side and rear view of the standoff leg;

FIG. 10 is a perspective view of the standoff assembly and partial cut-away view of the cell tray showing the respective components prior to installation;

FIG. 11 is a perspective view of the standoff assembly and partial cut-away view of the cell tray assembly showing the key having been installed into its assembled position;

FIG. 12 is a perspective view of the standoff assembly and partial cut-away view of the cell tray assembly illustrating the relative initial position of the key as it rotates upon installing the leg into its assembled position;

FIG. 13 is a perspective view of the standoff assembly and partial cut-away view of the cell tray assembly showing the assembled position of the standoff assembly;

DETAILED DESCRIPTION OF THE DRAWINGS

Figure 1:
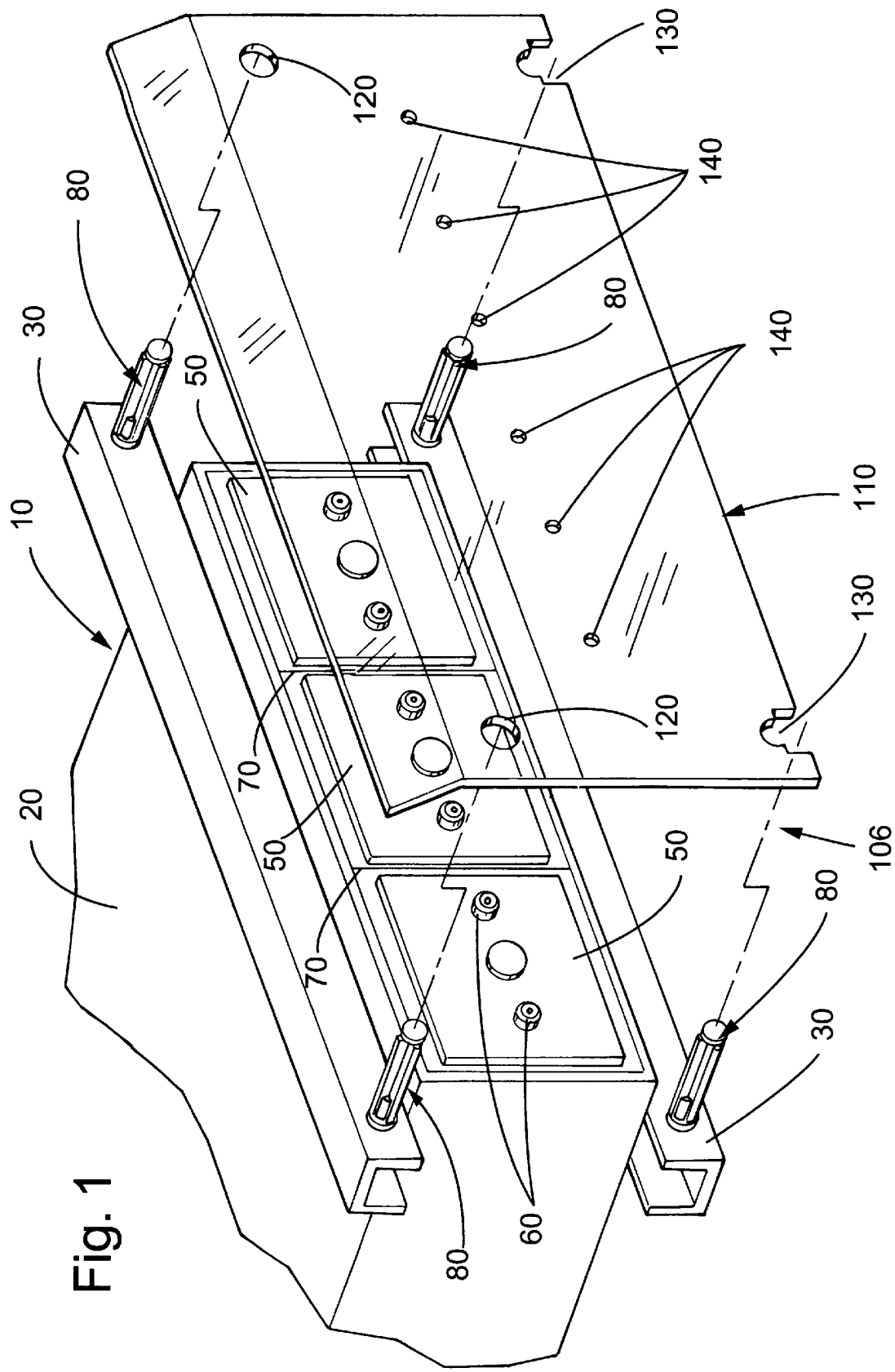
FIG. 1 is a perspective view of the cell tray assembly and cover system of the present invention with the cover pulled away from the standoff assemblies.

While the invention is susceptible to various modifications and alternative constructions, certain illustrative embodiments thereof have been shown in the drawings and will be described in detail below. It should be understood, however, that there is no intention to limit the invention to the specific configurations disclosed, but rather, the invention is to cover all modifications, alternative constructions and equivalents falling within the spirit and scope of the invention.

Figure 2:
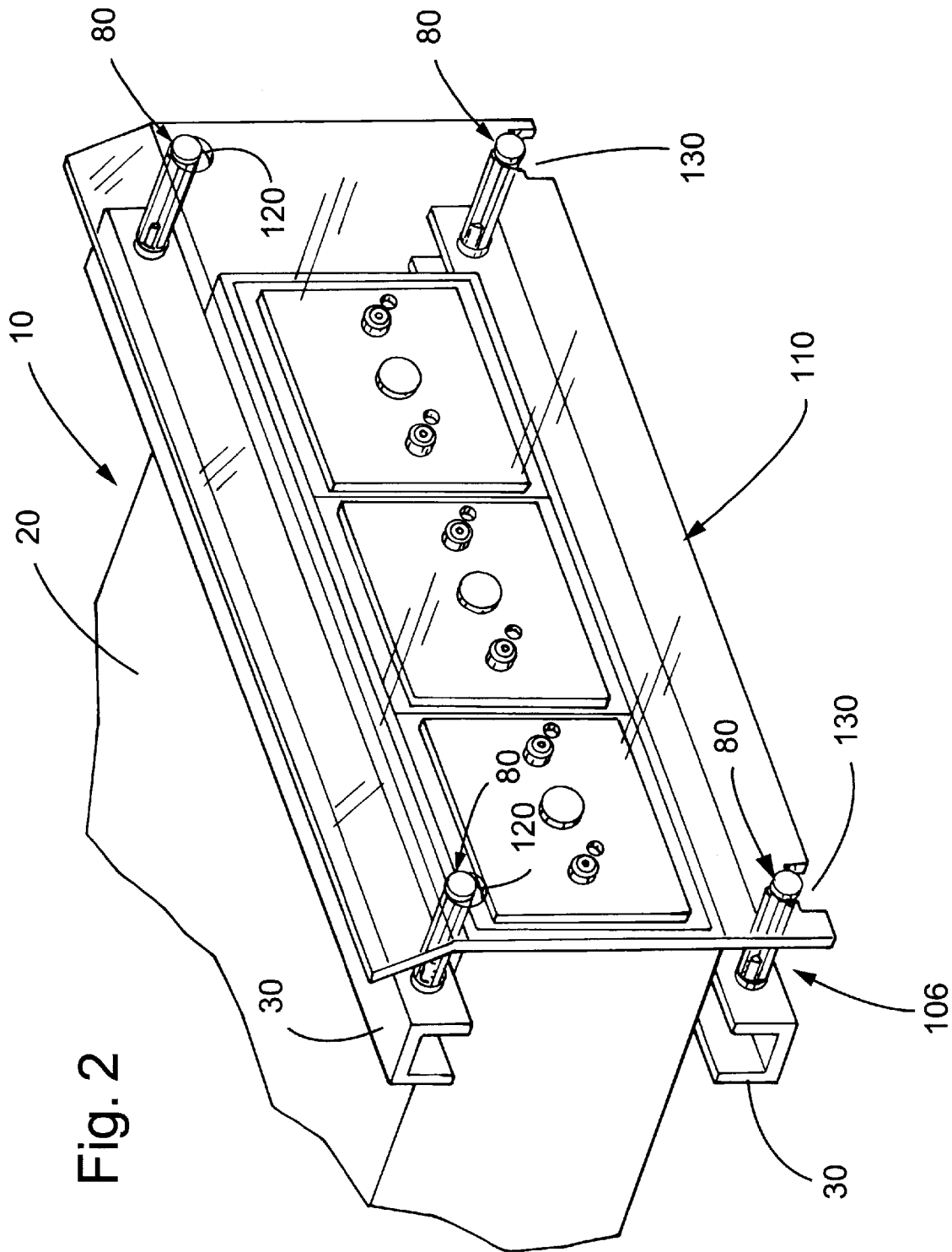
FIG. 2 is a perspective view of the cell tray assembly and cover system shown in FIG. 1 with the cover attached to the standoff assemblies.

The structure of the cell tray assembly used does not itself form a part of the present invention. Rather, the present invention is directed to the novel cover system and to a combination of such novel cover system with any compatible cell tray assembly. Many suitable cell or battery trays are known and may be used. The cell tray shown in FIGS. 1 and 2 represent one known cell tray that has been found to be useful in combination with the novel cover system described herein. Additionally, although the present invention may be used with any sealed lead-acid batteries or cells that satisfy the requirements of the particular application, it will be described herein in conjunction with sealed lead-acid cells.

FIG. 1 illustrates one embodiment of a conventional cell tray assembly 10 having a cell tray 20 with cell-receiving receptacles in which cells 50 are positioned. The cells 50 may be held within the cell-receiving receptacles by any suitable means not shown, one example being a steel angle or bar, as is known. Any such structure used can combine with the sizing of the receptacles to prevent movement of the cells 50 within. More particularly, cell partitions 70 may be positioned to fit the size of the cell 50 needed for the particular application. Steel channels 30 are attached to the cell tray by any means desired such as welding, riveting, bolting or the like. The channels 30 provide adequate rigidity for the cell tray assembly 10.

The cover system 106 and cell tray assembly 10 of the present invention are illustrated in FIGS. 1 and 2. It is a principal aspect of the present invention to provide a cover system 106 which may be readily installed onto and removed from a cell tray assembly 10 while minimizing the likelihood of accidental human contact with lead-acid cells 50, cell terminals 60 or cell connectors. The present invention overcomes the deficiencies of the prior art by providing a secure and electrically nonconductive cover system 106 which does not require the use of tools, much less electrically conductive tools for installation or removal. Additionally, the present cover system 106, in its fully attached position, permits observation and maintenance (i.e. voltage readings) of the lead-acid cells 50 without sacrificing protection from human contact with the cells. The cover system 106 also permits removal of the cover without adjusting or removing the cover supports.

As viewed in FIGS. 1 and 2, the cover system 106 includes a cover 110 and cover supports in the form of standoff assemblies 80. Each standoff assembly 80 is attached to the channel 30 of the cell tray assembly 10 and serves as a support for the cell tray cover 110. The cover 110 includes upper support openings 120 and lower support openings 130, each corresponding to a respective standoff assembly 80. In the preferred embodiment, each upper support opening 120 comprises a hole of a diameter sufficient to receive the standoff assemblies 80.

The lower support openings 130 preferably comprise a notch extending to the bottom of the cover 110. Similarly, the width of each lower support opening 130 must be sufficient to receive the standoff assembly 80. The lower openings 130 are designed to facilitate lateral and vertical alignment of the cover 110 with the standoff assemblies 80 during attachment of the cover 110 to the cell tray assembly 10. The support openings 120, 130 also facilitate removal of the cover 110 without necessitating adjustment or removal of the standoff assemblies 80. Although the support openings 120, 130 have been described in their preferred embodiments, it will be appreciated that many configurations may be used. For example, rather than a notch, the bottom support openings 130 may comprise holes similar to the upper support openings 120. The dimensions of the support openings 120, 130 will necessarily vary with the configuration of the standoff assemblies. Ideally, the support openings are of a size to facilitate readily placing the cover 110 onto the standoff assemblies 80 while still providing suitable tolerance for secure cover attachment. The dimensions between the cover openings 120, 130 will also vary with the orientation of the standoff assemblies 80.

The cover 110 may also provide terminal openings 140, each corresponding to a respective cell terminal 60. Ideally, the terminal openings 140 are of a size which permits passage of small instrument probes to the corresponding terminal 60 while still preventing human contact with the cells 50 or its components. As a result, voltage measurements of the individual cells 50 may be taken without removing the cover 110. Also, the cover 110 is preferably made of a transparent or semi-transparent electrically nonconductive material which permits observation of the battery face, terminals 60 and terminal connectors of the cells 50 while the cover 110 is attached to the cell tray assembly 10. An illustrative example of such transparent electrically nonconductive material is polyvinyl chloride with a ultraviolet additive, although it will be appreciated that many alternative materials and combinations of materials exist and may be used. The cover may fabricated as a cut and/or formed plastic sheet as is known. Additionally, stiffening ribs may be added to provide increased cover rigidity.

Figure 7:
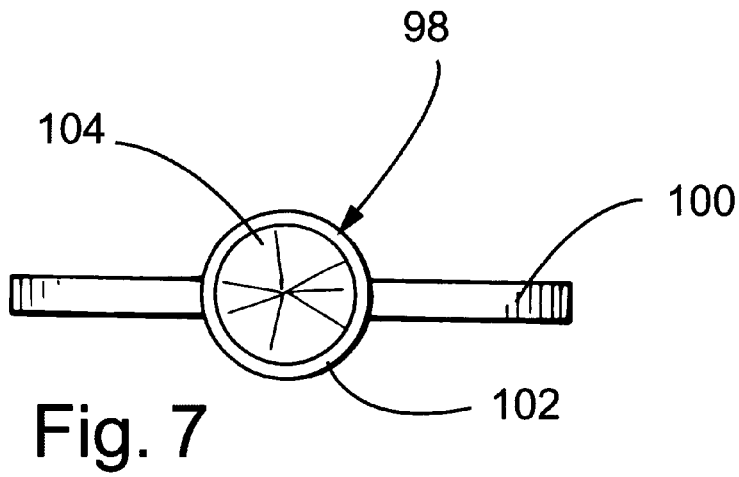
FIGS. 7–9, respectively are a front, side and rear view of the standoff leg.
Figure 8:
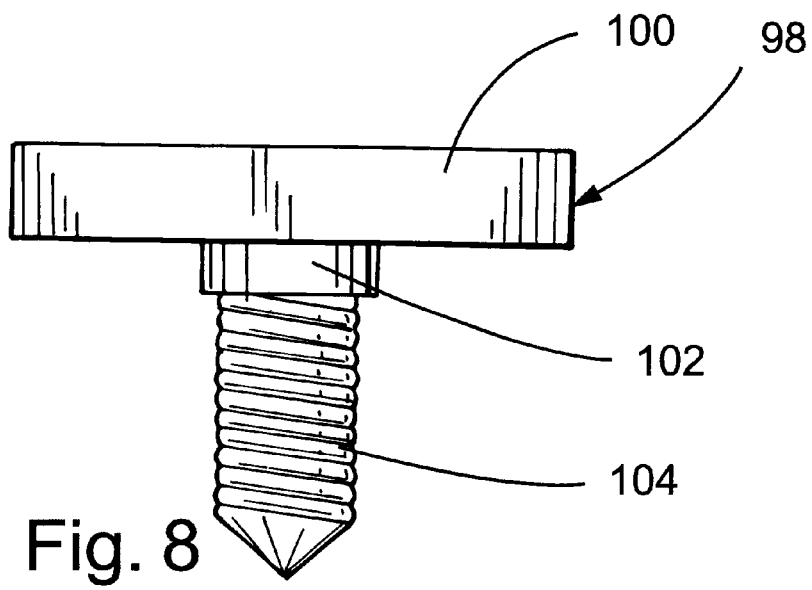
Figure 9:
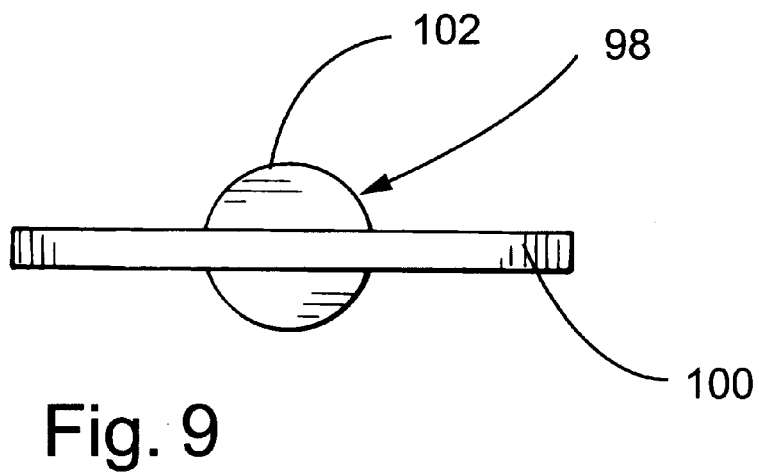

As viewed in FIG. 3, each standoff assembly 80 includes a leg 82 and a key 98 that may be attached to the channel 30 of the cell tray 10 through a channel opening 32. FIGS. 7–9 illustrate the key 98 which includes a handle 100, a shoulder 102, and a body 104. The leg 82 is elongated and includes a head 86, a neck 88, a body 85 and a tail 92 as most easily seen in FIGS. 3–6. The leg head 86 is preferably disk shaped and provides dimensions that permit passage of the leg head 86 through the support openings of the cover 120, 130 during attachment of the cover 110 to the cell tray assembly 10. The leg neck 88 connects the leg head 86 to the body 85 and necessarily has a smaller outside diameter than the leg head 86.

The leg body 85 provides a number of longitudinally extending stiffening ribs 84. In the illustrated embodiment, four equally spaced stiffening ribs 84 are provided around the periphery of the body 85 thus forming a "+" configuration as viewed in FIG. 4. Additional reinforcement ribs 90 may also be provided between the stiffening ribs 84 near the leg tail 92 for added rigidity and strength. The ribs 84, 90 provide strength to the leg while keeping leg material costs to a minimum. It will be appreciated that any number of ribs may be used, and the length, width and height of ribs may also vary as desired.

The leg tail 92 is disk shaped and includes a lateral opening 94 configured for receiving the body of the key 104. The opening of the leg 94 and the key body 104 provide a connection which may be interlocked for attachment of the standoff assembly 80 to the cell tray assembly 10. Although the interlocking connection may include any number of complementary configurations, preferably, the interlocking connection comprises a threaded opening 94 at the leg tail 92 and a complementary threaded key body 104.

FIGS. 10–13 illustrate the installation of the standoff assembly 80 onto the channel 30 of the cell tray assembly 10. Initially, the key 98 is inserted into the channel 30 and positioned such that the key body 104 protrudes through the channel opening 32 while the key shoulder 102 rests within the channel opening 32. The shoulder of the key 102 is dimensioned to fit and accurately position the key 102 within the channel opening 32. Additionally, the shoulder 102 imparts stress produced by the standoff assembly 80 and the attached cover 110 and prevents the threads of the key body 104 from damage. Such damage may result in difficulty engaging and/or disengaging the threaded connection between the leg 82 and key 98. As a practical matter, insertion of the key 98 into the channel opening 32 requires access to the inside of the channel 30. The illustrated embodiment provides channel access adjacent the channel's longitudinal end or through the opening provided opposite the channels horizontal surface. However, in reality channel access may be limited to the opening provided opposite the channel's horizontal surface if, for example, the end of the channel is adjoining the channel from another tray assembly. Alternatively, access may be provided through openings along the length of the channel 30.

Once the key is in place, the leg 82 is positioned to align the opening of the leg 94 with the body of the key 104. As viewed in FIG. 12, the threaded body of the key 104 is engaged with the threaded bore of the leg 94 by rotating the leg 98 in a clockwise direction. Initially, both the leg 82 and key 98 rotate. However, the key handle 100 is elongated to facilitate easy grasping and, more importantly, to engage the inside horizontal surface of the channel 34 and prevent full rotation of the key 98. While the key 98 is held in place by the inside horizontal surface of the channel 34, the leg 82 is continually rotated until, ultimately, the leg 82 and key 98 are secured to the channel 30. The leg tail 92 provides a large surface for flush engagement with the outside channel surface to ensure secure attachment between the standoff assembly 80 and the channel 30. The present standoff assembly 80 has sufficient strength and rigidity to be utilized with any application, thus eliminating the need for a variety of sizes and designs. Another aspect of the present invention provides that the design of the leg 82 and key 98 are such that full installation of the standoff assembly 80 may be achieved without the use of any tools. Furthermore, once the leg 82 and key 98 have started to threadingly engage, installation may be completed with one hand.

It will also be appreciated that for any given application the number and orientation of the standoff assemblies 80 along the channel 30 may vary as desired. Additionally, the present cover system 106 may also utilize only one standoff assembly 80 to support the cover 110. For instance, a single standoff assembly 80 positioned in the longitudinal center of the upper support channel 30 will securely support a cover 110 with a corresponding upper support opening 120. To this end, if multiple standoff assemblies 80 are used and, for whatever reason, a standoff assembly 80 breaks or the cover support holes 120, 130 are not properly positioned onto the standoff assemblies 80, one standoff assembly 80 has the strength to support the weight of the cover 110.

Once installation of the standoff assemblies 80 is complete, the cover 110 may be attached. As described earlier, the cover 110 is attached by aligning each of the cover support holes 120, 130 with its respective standoff assembly 80. This is accomplished by first aligning the lower openings 130 of the cover 110 with their corresponding standoff assemblies 80. The lower support openings 130 are then brought into contact with the leg necks 88 of these standoff assemblies 80 whereby the cover 110 may momentarily rest in this position. At this point, lateral alignment of the support holes 120, 130 with their respective standoff assemblies 80 is achieved. To complete the cover 110 attachment, the cover 110 need only be raised slightly such that the upper support openings 120 align properly with their respective standoff assemblies 80. The cover 110 is then positioned such that the leg heads 86 project through the cover support openings 120, 130. The cover 110 may then be lowered into a secure position whereby the top of each cover support opening 120, 130 rests on the corresponding leg neck 88. The leg necks 88 support the cover 110 in its attached position while the leg head 86 and leg body 85 prevent movement of the cover 110 along the length of the leg 82. The cover 110 is removed by simply raising the cover 110 to a position where the cover support openings 120, 130 will slide over the leg heads 86. The ratio of leg head 86 size to leg neck 88 size may vary. The variation will influence the distance necessary to disengage the cover support opening 120, 130 from the standoff assemblies 80.

The present cover system will also work for horizontal cell tray assemblies 10, in other words, a cell tray assembly 10 in which the face of each cell 50 is exposed at the top of the cell tray 20. In this configuration, the standoff assemblies 80 extend vertically from the top of the cell tray assembly 10, and the cover 110 is installed in a horizontal position. As before the leg body 84 and leg head 86 are dimensioned to prevent the cover 110 from moving along the length of the respective leg 82 when the cover 110 is in its attached position.

Figure 15:
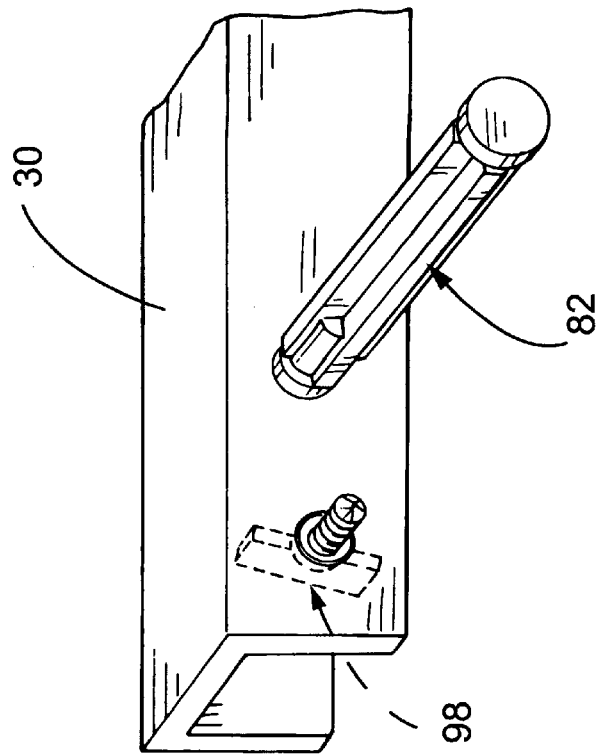
FIG. 15 is a perspective view of the standoff assembly and partial cut-away view of the cell tray assembly showing the respective components after the leg has been removed from its assembled position.
Figure 14:
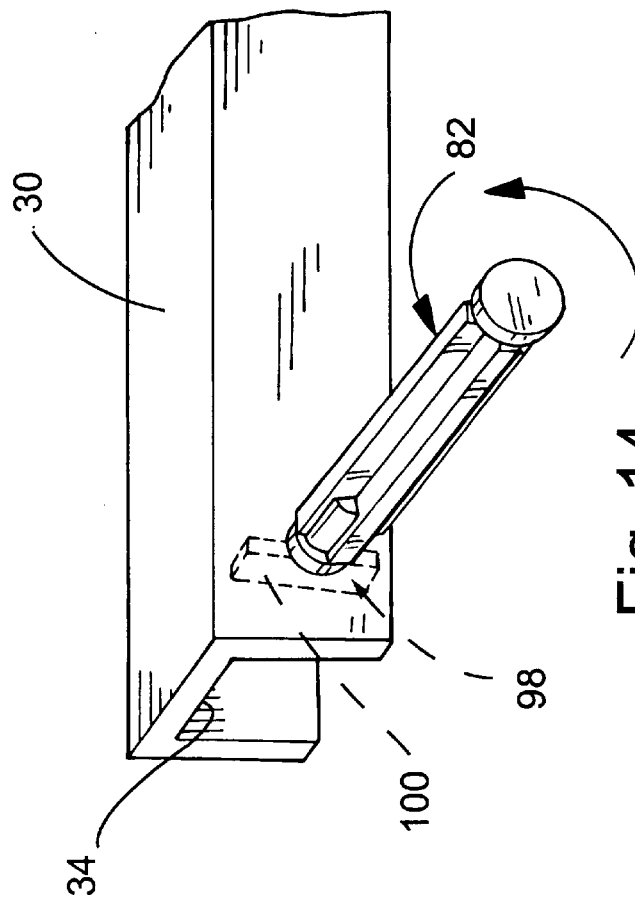
FIG. 14 is a perspective view of the standoff assembly and partial cut-away view of the cell tray assembly illustrating the relative initial position of the key as it rotates upon removal the leg from its assembled position.

Disassembly of the standoff assembly 80 is readily achieved. The standoff assembly 80 may be removed from the channel 30 without the use of tools. As viewed in FIGS. 14 and 15, the standoff assembly 80 may be removed from the channel 30 by simply rotating the leg 82 in a counter-clockwise direction. The key 98 will initially turn with the leg 82 until again the key handle 100 is forced against the inside upper surface of the channel 34. As the leg 82 is continually rotated, the threaded body of the key 104 and threaded bore of the leg 94 disengage, and removal of the standoff assembly 80 is complete. It will be appreciated that entire removal process may be performed with one hand. Additionally, it will be appreciated that the dimensions of the standoff assembly 80 of the present invention may be varied as desired, based upon the requirements for the particular application and materials of choice.

The standoff assembly 80 may be easily fabricated, for example, from injection molding any plastic or other non-conductive material which provides satisfactory structural rigidity and support in use with the cell trays employed to satisfy high seismic conditions and the other structural requirements of the particular application. As illustrative examples, suitable plastic materials which can be utilized include polyolefins such as polypropylene, polyvinyl chlorides, polycarbonates, and the like. Increased strength can be achieved by using any desired filler, many of which are known. As one example, it has been found desirable to include glass strands at a loading of about 30 to 40 percent by volume. As regards nonconductive materials other than plastics, illustrative examples include fiberglass and the like.

Thus, as has been seen, the present invention provides a cover system and cell tray assembly that can be advantageously utilized for a variety of stationary power applications. Considerable versatility may be achieved with only one configuration of cover system required for all sizes of commercially sized sealed lead-acid cells. The strength, protection and flexibility provided by the present system is particularly desirable and may find utility in virtually any stationary cell or battery application. Still further, while the present invention is desirably used with VRLA cells, it should be appreciated that the invention is equally applicable to use with conventional lead-acid cells such as are used in some stationary battery applications, as well as with batteries using electrochemical systems other than lead-acid.

We claim:

1. A cell tray assembly and cover system comprising:
   at least one battery tray assembly having first and second support surfaces and defining a cell-receiving area having an open end,
   a plurality of lead-acid cells each having a positive and a negative terminal and positioned in said cell-receiving area such that said terminals are adjacent said open end,
   a first and second channel member attached to said first and second support surfaces, at least one channel support opening disposed in at least said first channel member,
   a cover with support openings corresponding to and aligning with each channel support opening,
   a standoff assembly of an electrically nonconductive material for each channel support opening, each said standoff assembly comprising a key and a leg, said key having a handle and a body, said leg having a first end and a second end, said first end of said leg having a surface for extending through and a surface for supporting said cover, said second end of said leg having an opening for accepting and providing an interlocking connection with said body of said key, said handle of said key being located in a channel member and preventing fall rotation of said key therein, each said standoff assembly supporting said cover through said cover support opening.

2. The cell tray assembly and cover system of claim 1, wherein said second channel member has at least one channel support opening.

3. The cell tray assembly and cover system of claim 2, wherein said first end of said leg further comprises a head and a neck, wherein said head comprises said surface for extending through said cover, said neck comprises said surface for supporting said cover.

4. The cell tray assembly and cover system of claim 2, wherein said leg further comprises a head and a body, said head comprises said surface for extending through said cover, said body comprises said surface for supporting said cover.

5. The cell tray assembly and cover system of claim 3, wherein said interlocking connection between said key and said leg is a threaded connection.

6. The cell tray assembly and cover system of claim 5, wherein said body of said key further comprises a shoulder for engaging said channel support opening during attachment of each standoff assembly.

7. The cell tray assembly and cover system of claim 6, wherein each said channel member has an internal surface for contacting and preventing fall rotation of said key.

8. The cell tray assembly and cover system of claim 7, wherein said cover has a bottom edge and each cover support opening corresponds to and aligns with each second channel support opening and comprises a notch extending to said bottom edge.

9. The cell tray assembly and cover system of claim 1, wherein said cover comprises terminal openings corresponding to and aligning with said cell terminals.

10. The cell tray assembly and cover system of claim 1, wherein said leg provides a plurality of longitudinally extending stiffening ribs.

11. The cell tray assembly and cover system of claim 1, wherein said electrically nonconductive material is polyvinyl chloride with an ultraviolet additive.

12. A method of installing a cover system onto a cell tray assembly comprising the steps of:
   providing at least one battery tray assembly having first and second support surfaces and defining a cell-receiving area having an open end,
   providing a plurality of lead-acid cells each having a positive and a negative terminal,
   providing cells within said cell-receiving area such that said terminals are adjacent said open end,
   providing a first and second channel member attached to said first and second support surfaces'
   providing at least one channel support opening disposed in at least said first channel member,
   providing a cover with support openings corresponding to and aligning with each channel support opening,
   providing a standoff assembly of an electrically nonconductive material for each channel support opening, each said standoff assembly comprising a key and a leg, said key having a handle and a body, said leg having a first end and a second end, said first end of said leg having a surface for extending through and a surface for supporting said cover, said second end of said leg having an opening for accepting and providing an interlocking connection with said body of said key, placing each said key within a channel and inserting said key body through said channel support opening, positioning each leg opening onto each respective key body;

rotating each said leg such that each respective key also rotates to a position where said key head contacts said channel and no longer rotates with said leg, continuing to rotate each said leg until leg and key are secure, placing said cover onto each standoff assembly through each cover support opening, allowing cover opening to contact each standoff support surface.

13. The cell tray assembly and cover system of claim 12, wherein said second channel member has at least one channel support opening.

14. The method as in claim 13, wherein said first end of said leg further comprises a head and a neck wherein said neck comprises said surface for supporting said cover.

15. The method as in claim 13, wherein said leg further comprises a head and a body, said head comprises said surface for extending through said cover, said body comprises said surface for supporting said cover.

16. The method as in claim 14, wherein said interlocking connection between said key and said leg is a threaded connection.

17. The method as in claim 16, wherein said body of said key further comprises a shoulder for engaging said channel support opening during attachment of each standoff assembly.

18. The method as in claim 17, wherein each said channel member has an internal surface for contacting and preventing full rotation of said key.

19. The method as in claim 18, wherein said cover has a bottom edge and each cover support opening corresponds to and aligns with each second channel support opening and comprises a notch extending to said bottom edge.

20. The method as in claim 12, wherein said cover comprises terminal openings corresponding to and aligning with said cell terminals.

21. The method as in claim 12, wherein said leg provides a plurality of longitudinally extending stiffening ribs.

22. The method as in claim 12, wherein said electrically nonconductive material is polyvinyl chloride with an ultraviolet additive.

* * * * *